M. G. CHANDLER.
ROTARY VALVE FOR INTERNAL COMBUSTION ENGINES.
APPLICATION FILED APR. 1, 1912.
1,080,892.
Patented Dec. 9, 1913.
3 SHEETS—SHEET 1.
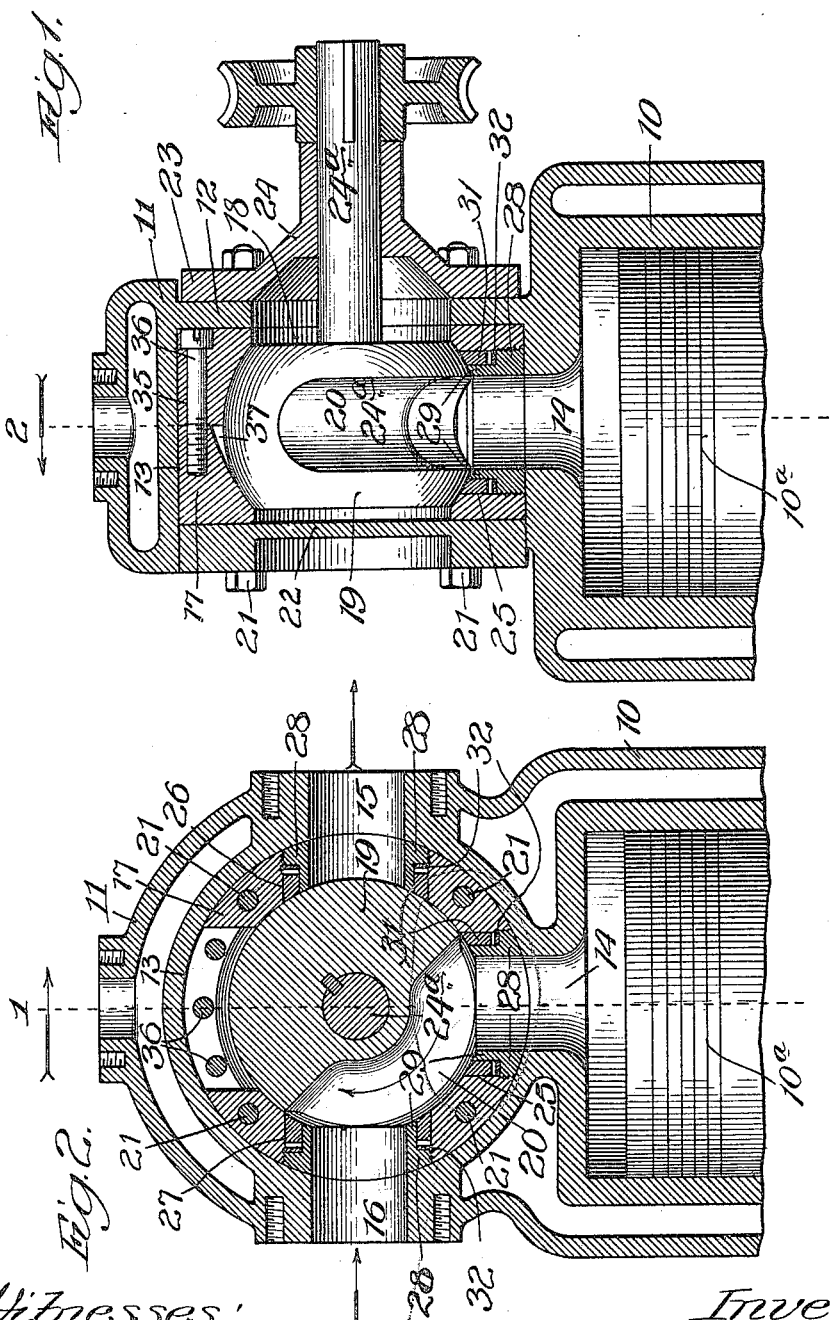
Witnesses:
Inventor:
Milford G. Chandler,
By Dyrenforth, Lee, Chritton & Wiles,
Attys.

M. G. CHANDLER.
ROTARY VALVE FOR INTERNAL COMBUSTION ENGINES.
APPLICATION FILED APR. 1, 1912.
1,080,892.
Patented Dec. 9, 1913.
3 SHEETS—SHEET 2.
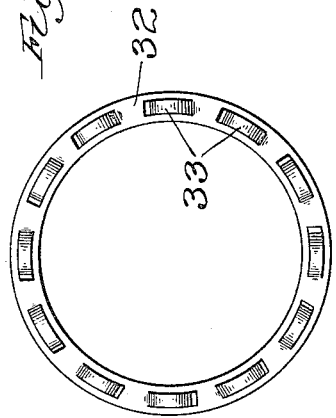
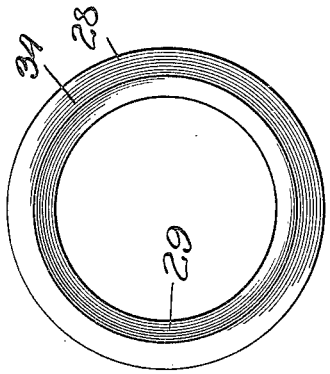
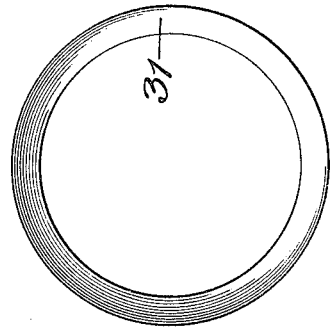
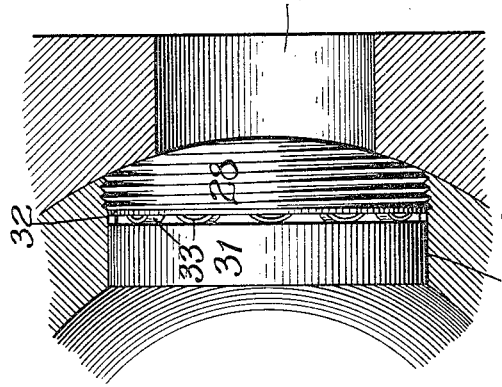
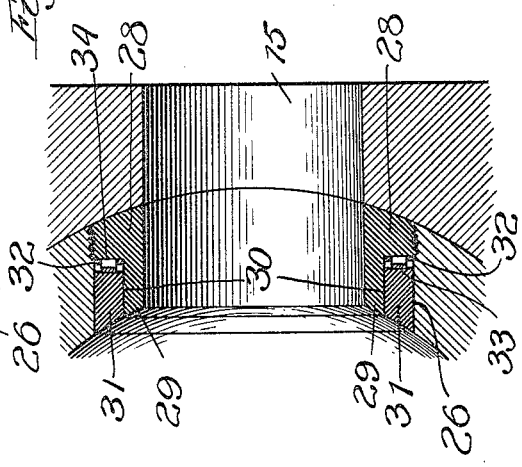
Witnesses:
Inventor:
Milford G. Chandler,

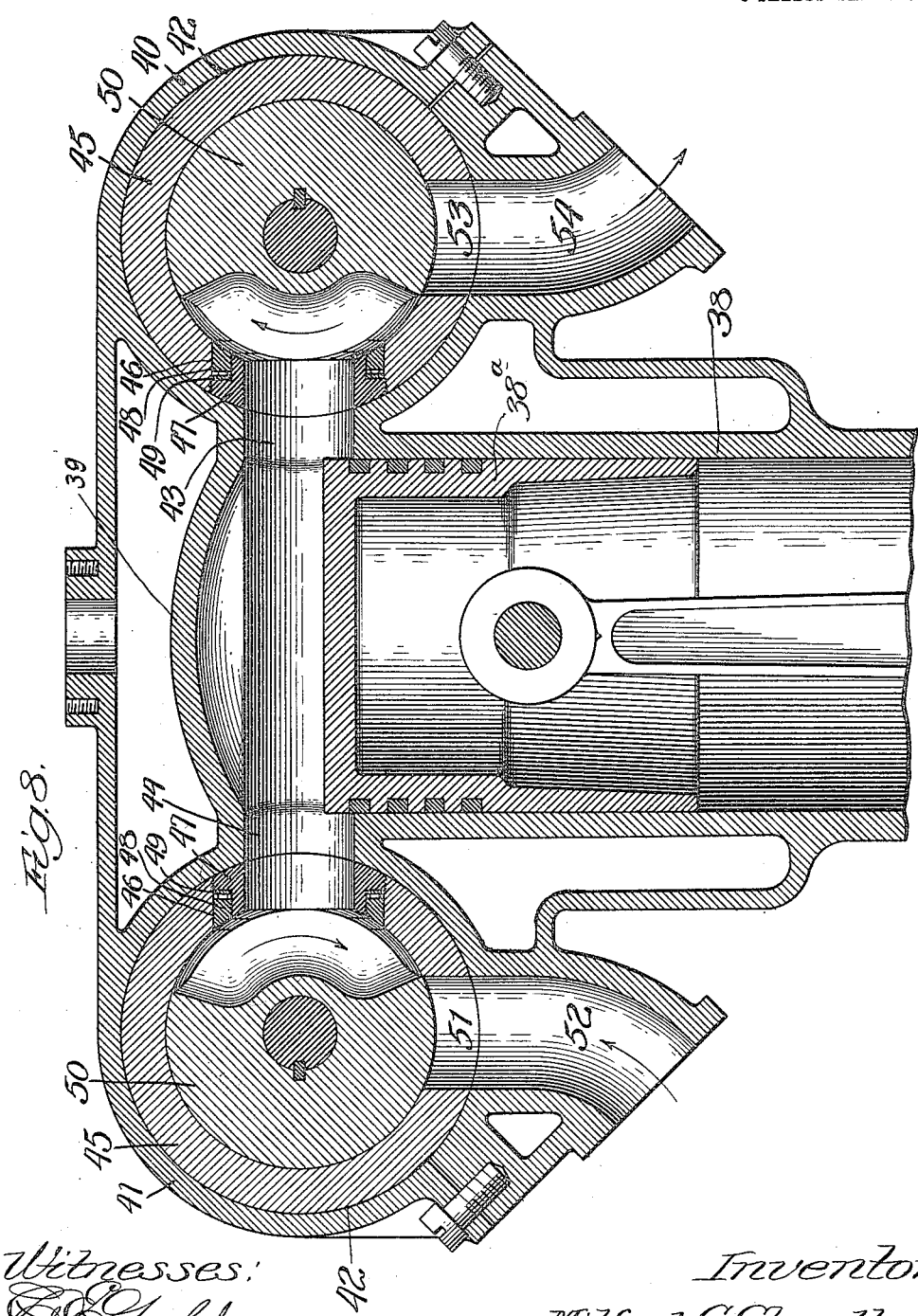

UNITED STATES PATENT OFFICE.

MILFORD G. CHANDLER, OF CHICAGO, ILLINOIS, ASSIGNOR TO CHANDLER ENGINE VALVE COMPANY, OF CHICAGO, ILLINOIS, A CORPORATION OF ILLINOIS.

ROTARY VALVE FOR INTERNAL-COMBUSTION ENGINES.

1,080,892. Specification of Letters Patent. Patented Dec. 9, 1913.

Application filed April 1, 1912. Serial No. 687,766.

*To all whom it may concern:*

Be it known that I, MILFORD G. CHANDLER, a citizen of the United States, residing at Chicago, in the county of Cook and State of Illinois, have invented a new and useful Rotary Valve for Internal-Combustion Engines, of which the following is a specification.

Rotary and oscillatory valves, as commonly provided, to properly perform their functions must at all times closely fit the valve-casings in which they operate in order that leakage around the valves be prevented. While a valve device for use under conditions in which it is not subjected to high temperatures may be so constructed that the requisite journal fit of the valve in its casing may be afforded, great skill and accuracy in manufacturing the valve-device is required. When the valve-device is to be used under conditions wherein it is subjected to relatively great heat, and especially relatively great changes in temperature, it is impossible that it be so constructed as to afford at all times the proper journal fit in the casing in which it operates, because of the contraction and expansion of the valve and its casing. Thus, if a valve is constructed of a diameter sufficient to permit it to operate when heated, without undue friction in its casing, the clearance between it and the casing must of necessity be so great as to cause leakage around the valve when relatively cold; and if so constructed, as to afford the desired journal fit in its casing when cold, it will bind in its casing when heated.

Various attempts have been made to provide constructions of rotary and oscillatory valves for internal combustion engines which will not present the above referred to objections, but all such attempts, so far as I am aware, have not been entirely successful as the valve devices while in some cases avoiding the above stated objections, have presented other disadvantages which render them objectionable.

My primary object is to provide novel and simple improvements in valves of the type stated whereby they may be economically manufactured, shall avoid the above stated objections and shall operate effectually under all conditions of use to prevent leakage around the valves of the gas pressure controlled thereby.

I have devised my improvements for use in connection with valves for internal combustion engines for controlling the admission of the charges to the engine cylinder or cylinders, or the exhaust of burnt gases therefrom, or both, as desired, and I have therefore illustrated it in the drawings in this connection.

Referring to the accompanying drawings—Figure 1 is a view in vertical sectional elevation of the upper end portion of an internal combustion engine equipped with valve-mechanism of the strictly rotary type, constructed in accordance with my invention for controlling both the inlet to and exhaust from the cylinder, the section being taken at the line 1 on Fig. 2 and viewed in the direction of the arrow. Fig. 2 is a section taken at the line 2 on Fig. 1 and viewed in the direction of the arrow. Fig. 3 is an enlarged sectional view of a portion of the valve device illustrated in Fig. 2 showing in elevation one of the similar bushings employed, and the packing-member surrounding the bushing. Fig. 4 is a view similar to Fig. 3 and showing the bushing and surrounding packing-member in section. Fig. 5 is a face view of a spring ring for coöperation with the packing-member. Fig. 6 is a view in elevation of the inner end of the packing-member illustrated in Figs. 3 and 4, this view showing the contour of that end of the packing-member which bears against the valve proper. Fig. 7 is a view in elevation of one end of the bushing illustrated in Figs. 3 and 4; and Fig. 8, a view in vertical sectional elevation of an internal combustion engine, the illustrated cylinder of which is equipped with separate valves of the strictly rotary type, constructed in accordance with my invention for controlling the inlet to and exhaust from the cylinder.

Referring to Figs. 1 to 7 inclusive, the upper portion of a cylinder of an internal combustion engine of the four-cycle type is illustrated at 10 and is formed with a hollow cylindrical head 11, provided internally near one end with a centrally apertured web or plate section 12, the head 11 in the construction illustrated being cast integrally with the cylinder 10 and presenting a cylindrical bore 13. The head 11 contains ports 14, 15 and 16, the port 14 opening into the interior of the cylinder 10 and forming the inlet to and exhaust from the cylinder, and the ports 16 and 15, which are diametrically opposed and midway between which the port 14 is located, being adapted for connection with the source of fuel supply, as for example, a carbureter (not shown), and with the exhaust-pipe of the engine, respectively.

Located in the head 11 is the valve-casing proper 17 of the valve, which is open-ended, as represented at 18, and is formed as hereinafter described. The casing 17 contains the valve-proper 19 of my improved valve-device, the valve 19, which is in the form of a section of a sphere, containing a port 20 which is of sufficient size to open the port 14 to the ports 15 and 16 successively, said valve having journal fit in the casing 17, the conformation of the interior of the casing 17 corresponding with the conformation or contour of the periphery of the valve 19.

The casing 17 and valve 19 after being assembled preferably as hereinafter described, are inserted into the head 11 to the position illustrated in Fig. 1 and secured therein as by bolts 21, which pass through the casing 17, web 12 and plates 22 and 23, the plate 22 seating against an end of the casing 17, and the plate 23, which has a centrally disposed boss 24 thereon in which the stem $24^a$ of the valve 19 is journaled, seating against the outer surface of the web 12.

The valve-casing 17, which is stationary, contains openings 25, 26 and 27, which register with the ports 14, 15 and 16 respectively, and screwed into the openings 25, 26 and 27, are bushings 28, having reduced inner ends 29 to afford annular recesses 30 between the bushings 28 and the walls of the openings 25, 26 and 27 in the casing 17, the recesses 30 opening into the interior of the casing 17. Located in the recesses 30 and movable therein radially of the center of the valve 19, are packing-members 31 which are preferably in the form of rings of any suitable material, the ends of the members 31 which are held in contact with the periphery of the valve 19, as hereinafter described, being so shaped, as represented, as to conform to the spherical contour of the periphery of the valve 19. Means are provided for holding the packing-members 31 in contact with the valve 19 at all times. Any suitable means for this purpose may be provided, those shown in the drawings comprising rings 32 of spring metal containing annular series of spring fingers 33 cut from the body of the rings 32. The rings 32 are confined in the recesses 30 between annular shoulders 34 on the bushings and the inner ends of the packing-members 31, the parts described being so constructed and arranged that the fingers 33 of the rings 32 will be under tension and press the packing-members 31 against the periphery of the valve 19 with the desired degree of pressure for preventing the escape of fluid-pressure around the valve from the ports which they surround.

The valve 19 may be operated in any suitable manner to time its rotation, and consequently the opening and closing of the ports 16 and 15 to the port 14, for the introduction of charges into the cylinder and the exhaust of the burnt gases therefrom, with relation to the engine piston $10^a$, but as mechanism for this purpose in connection with rotary valves of the general type to which my invention relates is commonly used and is well known in the art and as my invention does not relate to means for rotating the valve, a description of valve-operating means is deemed unnecessary.

The valve-casing 17 is preferably formed integrally, excepting as to a segmental portion thereof at its upper end represented at 35, the portion 35 of the casing 17 being separate from the body of the casing and adapted to be secured in place to render the casing 17 continuous, as by screws 36, after the valve 19 is inserted into the casing 17, the inner wall of the upper end portion of the casing 17 adjacent to the segment 35 being cut away as represented at 37, to permit the valve to be introduced into the casing 17. The segment 35 is of a length slightly in excess of the width of the valve 19 and thus the valve 19 may be introduced into and seated in the casing 17 by inserting the valve into said casing cross-wise of the latter through the opening in the casing 17, which is filled by the segment 35 when the latter is in place. In introducing the valve into the casing 17, as stated, it is introduced through said last referred to opening and the open end of the casing 17 at right angles to the position the valve occupies in Fig. 1, and after it has been thus inserted into the interior of the casing 17, it is given a quarter turn therein to properly position it for operation in the casing as shown in Fig. 1, wherein its periphery is concentric with the internal surface of the casing 17.

In the construction illustrated in Fig. 8, the valve means for controlling the inlet to the engine cylinder and exhaust therefrom, instead of being in the form of a single valve device, is formed of two valve devices which are constructed in accordance with my invention, one for controlling the inlet of the gas to the engine cylinder and the other the exhaust of burnt gases therefrom. In this construction the engine cylinder represented at 38 is equipped at its upper end with a head 39, formed laterally with extensions 40 and 41, having cylindrical bores 42, and containing openings 43 and 44, respectively, communicating with the interior of the cylinder 38. Secured in the bores 42 to be stationary therein are cylindrical valve-casings 45, the interior surfaces of which are of spherical conformation, as in the case of casing 17, the casings 45 containing openings 46 in registration with the openings 43 and 44. Confined in the openings 46 are bushings 47, packing-members 48 and rings 49 of the same construction and arranged in the same manner as described of the bushings 28, packing-members 31 and rings 32 respectively of the preceding figures. The casings 45 contain rotary valves 50 of the same construction as the valve 19 and operate in the same manner as these valves, the packing-members 48 bearing against the peripheries of the valves 50 and thereby operating to prevent leakage of the fluid-pressure around the valves.

In the construction illustrated in Fig. 8 the valve casing 45 in the extension 41 is ported, as indicated at 51, and opens into a passage 52 in said extension which in practice would be in communication with a source of gas supply not shown, as for instance, a carbureter, whereas the valve-casing 45 in the extension 40, which is ported as indicated at 53, opens into an exhaust-passage 54 in said extension.

It will be understood that the valves 50 may be rotated in any suitable manner, as is well known in the art, for properly timing relative to the piston 38ª of the engine, the opening of the passage 52 to the interior of the cylinder 38 and the opening of the exhaust 54 to the cylinder for admitting charges to the engine and the exhaust of spent gases therefrom at the proper times. Furthermore, the cost of manufacturing a valve in accordance with my invention is relatively low and the parts of the valve may be readily turned, in the process of manufacturing them, to the proper condition for insuring a tight joint.

It will be manifest that by constructing a valve in accordance with my invention, the desired clearance between the valve proper and the casing in which it operates may be provided for preventing the binding of the valve therein when used under conditions subjecting it to extreme heat, without impairing the tightness of the valve.

While I have illustrated and described my invention as embodied in a valve of the strictly rotary type in that in its operation it is rotated continuously in but one direction, it will be manifest that it may be embodied in a valve of the oscillatory type.

It will be understood that the feature of my invention consists in providing of spherical form that portion of the valve, whether it be strictly of the rotary or of the oscillatory type, which traverses the packing member surrounding the port to be controlled during the time said port is closed, and thus in its preferred form, the valve is in the form of a section of a sphere. It will be understood, however, that so long as that portion of the periphery of the valve which moves against the packing member while the port to be controlled thereby is closed, is of spherical form, it matters not how nearly the valve is a complete sphere.

By using the word "rotatory" in the following claims I wish to be understood as intending to claim thereby any valve which moves about an axis, as for example, those commonly termed rotary valves and oscillatory or rocker valves.

What I claim as new and desire to secure by Letters Patent is—

1. The combination with an internal combustion engine having a port, of a rotatory valve for controlling said port adapted to be operated in timed relation to the piston of the engine, and a packing member surrounding said port and bearing at an end thereof against said valve, that portion of said valve which traverses said packing member being of spherical form and the end of said packing member which bears against said valve conforming to the spherical surface of the latter and the bearing diameter of said member being substantially less than the spherical diameter of the valve, for the purpose set forth.

2. The combination with an internal combustion engine having a port, of a rotatory valve for controlling said port adapted to be operated in timed relation to the piston of the engine, and a packing member surrounding said port and bearing at an end thereof against said valve, and means for forcing the end of said packing member against said valve, that portion of said valve which traverses said packing member being of spherical form and the end of said packing member which bears against said valve conforming to the spherical surface of the latter and the bearing diameter of said member being substantially less than the spherical diameter of the valve, for the purpose set forth.

3. The combination with an internal combustion engine having a ported valve-casing, of a rotatory valve in said casing adapted to be operated in timed relation to the piston of the engine, and a packing member surrounding the port in said casing and bearing at an end thereof against said valve, that portion of said valve which traverses said member being of spherical form and the end of said member which bears against said valve conforming to the spherical surface of the latter and the bearing diameter of said member being substantially less than the spherical diameter of the valve, for the purpose set forth.

4. The combination with an internal combustion engine having a ported valve-casing, of a rotatory valve in said casing adapted to be operated in timed relation to the piston of the engine, and a packing ring surrounding the port in said casing and bearing at an end thereof against said valve, that portion of said valve which traverses said ring being of spherical form and the end of said ring which bears against said valve conforming to the spherical surface of the latter and the bearing diameter of said ring being substantially less than the spherical diameter of the valve, for the purpose set forth.

5. The combination with an internal combustion engine having a ported valve-casing, of a rotatory valve in said casing adapted to be operated in timed relation to the piston of the engine, a packing member surrounding the port in said casing, and means for pressing the end of said member against said valve, that portion of said valve which traverses said member being of spherical form and the end of said member which bears against said valve conforming to the spherical surface of the latter and the bearing diameter of said member being substantially less than the spherical diameter of the valve, for the purpose set forth.

6. The combination with an internal combustion engine having a ported valve-casing, of a rotatory valve in said casing adapted to be operated in timed relation to the piston of the engine, a packing member surrounding the port in said casing, and spring means for pressing the end of said member against said valve, that portion of said valve which traverses said member being of spherical form and the end of said member which bears against said valve conforming to the spherical surface of the latter and the bearing diameter of said member being substantially less than the spherical diameter of the valve, for the purpose set forth.

7. The combination with an internal combustion engine having a ported valve-casing, of a rotatory valve in said casing adapted to be operated in timed relation to the piston of the engine, and a packing member surrounding the port in said casing and radially disposed relative to the center of said valve and bearing at an end thereof against said valve, that portion of said valve which traverses said member being of spherical form and the end of said member which bears against said valve conforming to the spherical surface of the latter and the bearing diameter of said member being substantially less than the spherical diameter of the valve, for the purpose set forth.

8. The combination with an internal combustion engine having a ported valve-casing, of a rotatory valve in said casing adapted to be operated in timed relation to the piston of the engine, a packing member surrounding the port in said casing and radially disposed relative to the center of said valve, and means for pressing the end of said member against said valve, that portion of said valve which traverses said member being of spherical form and the end of said member which bears against said valve conforming to the spherical surface of the latter and the bearing diameter of said member being substantially less than the spherical diameter of the valve, for the purpose set forth.

9. The combination with an internal combustion engine having a ported valve-casing containing an inwardly-opening recess on its inner surface, a rotatory valve in said casing adapted to be operated in timed relation to the piston of the engine, and a packing member in said recess and surrounding the port in said casing and bearing at an end thereof against the said valve, that portion of said valve which traverses said member being of spherical form and the end of said member which bears against said valve conforming to the spherical surface of the latter and the bearing diameter of said member being substantially less than the spherical diameter of the valve, for the purpose set forth.

10. The combination with an internal combustion engine having a ported valve-casing containing an inwardly-opening recess on its inner surface, a rotatory valve in said casing adapted to be operated in timed relation to the piston of the engine, a packing member in said recess and surrounding the port in said casing, and means in said recess for pressing the end of said member against said valve, that portion of said valve which traverses said member being of spherical form and the end of said member which bears against said valve conforming to the spherical surface of the latter and the bearing diameter of said member being substantially less than the spherical diameter of the valve, for the purpose set forth.

11. In a valve device of the character described, the combination of its valve-casing containing a port-opening, a rotatory valve in said casing, a bushing confined in said port-opening, and a packing member surrounding the inner end of said bushing and bearing at an end thereof against said valve, that portion of said valve which traverses said member being of spherical form and the end of said member which bears against said valve conforming to the spherical surface of the latter, for the purpose set forth.

12. In a valve device of the character described, the combination of its valve-casing containing a port-opening, a rotatory valve in said casing, a bushing confined in said port-opening, a packing member surrounding the inner end of said bushing, and means for pressing the end of said member against said valve, that portion of said valve which traverses said member being of spherical form and the end of said member which bears against said valve conforming to the spherical surface of the latter, for the purpose set forth.

13. In a valve device of the character described, the combination of its valve-casing containing a port-opening, a rotatory valve in said casing, a bushing confined in said port-opening and having its inner end of reduced diameter to afford with the wall of said opening a recess on the interior of said casing and surrounding said bushing, and a packing member in said recess and bearing at an end thereof against said valve, that portion of said valve which traverses said member being of spherical form and the end of said member which bears against said valve conforming to the spherical surface of the latter, for the purpose set forth.

14. In a valve device of the character described, the combination of its valve-casing containing a port-opening, a rotatory valve in said casing, a bushing confined in said port-opening, and having its inner end of reduced diameter to afford with the wall of said opening a recess on the interior of said casing and surrounding said bushing, a packing member in said recess, and means for pressing the end of said member against said valve, that portion of said valve which traverses said member being of spherical form and the end of said member which bears against said valve conforming to the spherical surface of the latter, for the purpose set forth.

15. In a valve device of the character described, the combination of a casing having a spherical interior, and a valve in the form of a segment of a sphere, said casing being formed integrally excepting a segmental portion thereof of greater area than the longitudinal cross-sectional area of said valve.

16. In a valve device of the character described, the combination of a ported casing having a spherical interior, and a valve in the form of a segment of a sphere, said casing being formed integrally excepting a segmental portion thereof beyond the port in said casing and of greater area than the longitudinal cross-sectional area of the valve.

17. In a valve device of the character described, the combination of a ported casing having a spherical interior, a valve in the form of a sectional sphere in said casing, said casing being formed integrally excepting a segmental portion thereof, beyond said port, of greater area than the longitudinal cross-sectional area of said valve, a bushing having its inner end of reduced diameter secured in the port in said valve-casing and forming with the wall of said port an annular inwardly-opening recess, a packing-ring located in said recess and surrounding the opening through said bushing, and spring means confined between said bushing and ring operating to force and hold the latter in close frictional engagement with the spherical surface of said valve, the end of said ring which bears against said valve conforming to the spherical surface of the latter.

MILFORD G. CHANDLER.

In presence of—
O. C. AVISUS,
A. C. FISCHER.

---

Copies of this patent may be obtained for five cents each, by addressing the "Commissioner of Patents, Washington, D. C."